(12) United States Patent
McConville et al.

(10) Patent No.: US 7,819,096 B2
(45) Date of Patent: Oct. 26, 2010

(54) CYLINDER VALVE OPERATING SYSTEM FOR RECIPROCATING INTERNAL COMBUSTION ENGINE

(75) Inventors: Greg P. McConville, Ann Arbor, MI (US); Yihua S. Barber, Novi, MI (US); Mark A. Zagata, Livonia, MI (US)

(73) Assignee: Ford Global Technologies, Dearborn, MI (US)

( * ) Notice: Subject to any disclaimer, the term of this patent is extended or adjusted under 35 U.S.C. 154(b) by 455 days.

(21) Appl. No.: 11/927,727

(22) Filed: Oct. 30, 2007

(65) Prior Publication Data
US 2009/0107432 A1    Apr. 30, 2009

(51) Int. Cl.
*F01L 9/02*    (2006.01)
(52) U.S. Cl. .............. 123/90.12; 123/90.16; 123/90.31
(58) Field of Classification Search .............. 123/90.12, 123/90.13, 90.16, 90.27, 90.31, 90.6
See application file for complete search history.

(56) References Cited

U.S. PATENT DOCUMENTS

| 4,516,542 | A | 5/1985 | Aoyoma et al. |
| 5,537,963 | A | 7/1996 | Hasebe et al. |
| 5,803,040 | A | 9/1998 | Biesinger et al. |
| 6,058,895 | A | 5/2000 | Hermsen |
| 6,752,121 | B2 | 6/2004 | Rayl et al. |
| 2002/0100451 | A1 | 8/2002 | Shindou et al. |
| 2002/0121252 | A1 | 9/2002 | Payne et al. |
| 2005/0284438 | A1 | 12/2005 | Hasebe et al. |

FOREIGN PATENT DOCUMENTS

| GB | 2151702 A | 7/1985 |
| JP | 63-106309 | 5/1988 |

*Primary Examiner*—Ching Chang
(74) *Attorney, Agent, or Firm*—Jerome R. Drouillard; Julia Voutyras

(57) ABSTRACT

A cylinder valve operating system for an internal combustion engine includes a camshaft driving a number of intake and exhaust valve operators which may be selectively disabled through the operation of a valving system including a hydraulic phase shifter integrated with the camshaft and connected between a source of high pressure oil and at least the intake valve operators. The hydraulic phase shifter allows one group of valves, such as the exhaust valves, to be disabled before the other group of valves, typically the intake valves.

17 Claims, 4 Drawing Sheets

CYLINDER VALVE OPERATING SYSTEM FOR RECIPROCATING INTERNAL COMBUSTION ENGINE

CROSS REFERENCE TO RELATED APPLICATIONS

None.

BACKGROUND OF THE INVENTION

1. Field of the Invention

The present invention relates to a reciprocating internal combustion engine having poppet valves which are driven by a camshaft. The valves may be disabled selectively, so as to effectively change the displacement of the engine.

2. Disclosure Information

Dual displacement engines characterized by the capability to deactivate the intake and exhaust valves for particular cylinders, so as to increase fuel economy, are known in the art. One method for deactivating valves involves a hydraulic control of the valve actuation systems. Unfortunately, hydraulic control is rendered more expensive because of the need to provide separate control circuits, including control valves, for both the intake and exhaust valves. In other words, electronic control valves must be provided to meter or restrict the flow of oil to the valve operators for both intake and exhaust valves. In a V-type engine, this commonly means that four electronic control valves must be employed to deactivate various cylinders of the engine.

It would be desirable to provide a deactivation system requiring only a single valve for each bank of cylinders, while preserving the phasing necessary to properly deactivate and reactivate the cylinders. In general, phasing is best accomplished by deactivating the exhaust valve first for any particular cylinder, followed by deactivation of the intake valve for the same cylinder. Deactivation of the intake and exhaust valves in this sequence will trap a burnt charge in the engine's cylinder, preventing excess vacuum in the cylinder, which could pull in crankcase gases. This phased deactivation of the exhaust and intake valves will avoid a puff of unburned hydrocarbon when the cylinders are reactivated. Heretofore, this phasing aspect has, as noted above, required multiple control valves. The present invention avoids the need for multiple deactivation control valves for any particular bank of cylinders in an engine.

SUMMARY OF THE INVENTION

A cylinder valve operating system for an internal combustion engine includes a camshaft having a number of lobes and a corresponding grouping of hydraulically controllable intake valve operators and hydraulically controllable exhaust valve operators. All of the various operators are driven by the camshaft lobes. A number of intake valves are actuated by the intake valve operators, and a number of exhaust valves are actuated by the exhaust valve operators. A source of high pressure oil is valved to the intake valve operators and to the exhaust valve operators. The valving system includes a hydraulic phase shifter integrated with the camshaft and connected between the source of high pressure oil and the intake valve operators and exhaust valve operators, so as to phase the hydraulic control of the intake valve operators with respect to the exhaust valve operators. This delays deactivation of certain intake valves until the exhaust valves for each respective cylinder have been deactivated.

According to another aspect of the present invention, the valving system for controlling the flow of high pressure oil to the intake and exhaust valve operators further includes a supply valve for coupling the source of high pressure oil to the hydraulic phase shifter.

According to another aspect of the present invention, a hydraulic phase shifter includes a valve body having a central bore equipped with a supply port for receiving oil from the high pressure source, and a number of outlet ports, with the first outlet port connected with the intake valve operators and a second outlet port connected with the exhaust valve operators. A metering surface is formed on the journal of the camshaft, such that the metering surface extends within the central bore of the valve body. The metering surface includes a generally cylindrical surface having a plurality of metering grooves for connecting the supply port with the outlet ports in a phased relationship.

The camshaft's metering grooves, according to another aspect of the present invention, preferably include a continuous circumferential groove for connecting the supply port with an outlet port operatively connected with at least one exhaust valve operator, and a discontinuous, semi-circumferential groove adjoining the continuous groove, for intermittently connecting the supply port with at least one intake valve operator. According to another aspect of the present invention, the valve body may be configured as a camshaft mounting tower integrated with a cylinder head of the engine.

In order to promote smoother operation of the present system, the valving system may further include an intermittent bypass for routing oil directly from the high pressure source to at least one of the intake valve operators and exhaust valve operators, without passing through the hydraulic phase shifter. The system may also include a hydraulic accumulator interposed between the hydraulic phase shifter and at least one of the intake valve operators and exhaust valve operators.

The present system provides hydraulic control to selectively disable the exhaust and intake valves actuated by the system's intake and exhaust valve operators. The hydraulic phase shifter cooperates with the intake valve operators and the exhaust valve operators to disable at least one intake valve and at least one exhaust valve, with the exhaust valve being disabled before the intake valve on a given cylinder, so as to trap burned exhaust gas within at least one cylinder of the engine.

According to another aspect of the present invention, the intake valve operators and exhaust valve operators may each include a camshaft follower, a valve actuating finger, and a hydraulically lockable pin slidably located between the camshaft follower and the valve actuating finger, with the hydraulically lockable pin being responsive to oil pressure within a rocker shaft or other oil passage which is connected with the hydraulic phase shifter integrated with the camshaft.

It is an advantage of a cylinder valve operating system according to the present invention that cylinder deactivation may be accomplished with a minimum amount of hardware and, more specifically, with a single solenoid operated valve per cylinder bank.

It is yet another advantage of a system according to the present invention that cylinder deactivation may be phased with only a single electronic switching valve in the system because the present hydraulic phase shifter utilizes the motion of the camshaft to achieve intake-to-exhaust phase shifting without the need for intervening electronic devices.

Other features and advantages of the present invention will become apparent to the reader of this specification.

DETAILED DESCRIPTION OF THE PREFERRED EMBODIMENTS

Figure 1:
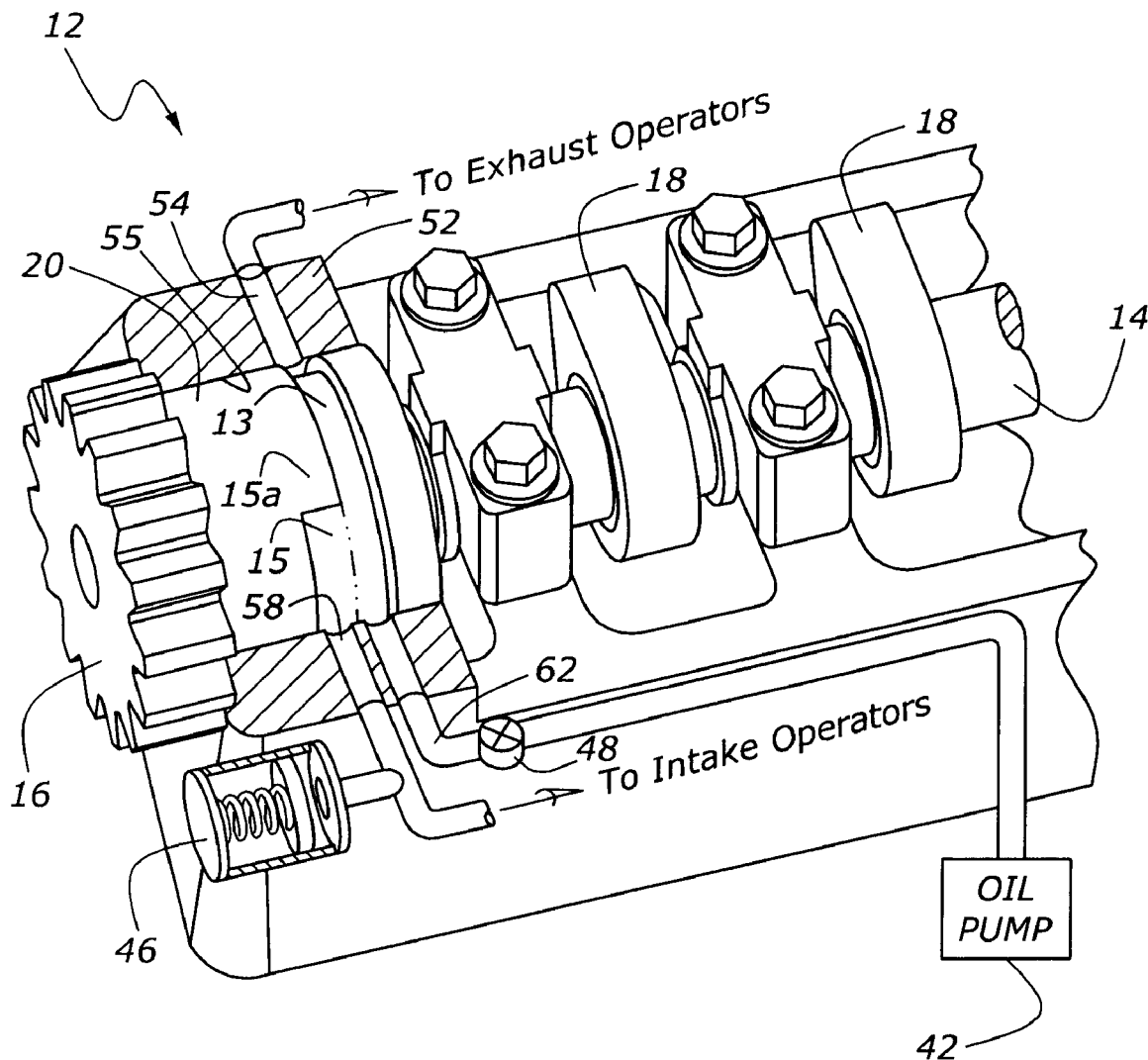
FIG. 1 is a schematic representation of a portion of a cylinder valve operating system according to an aspect of the present invention.
Figure 2:
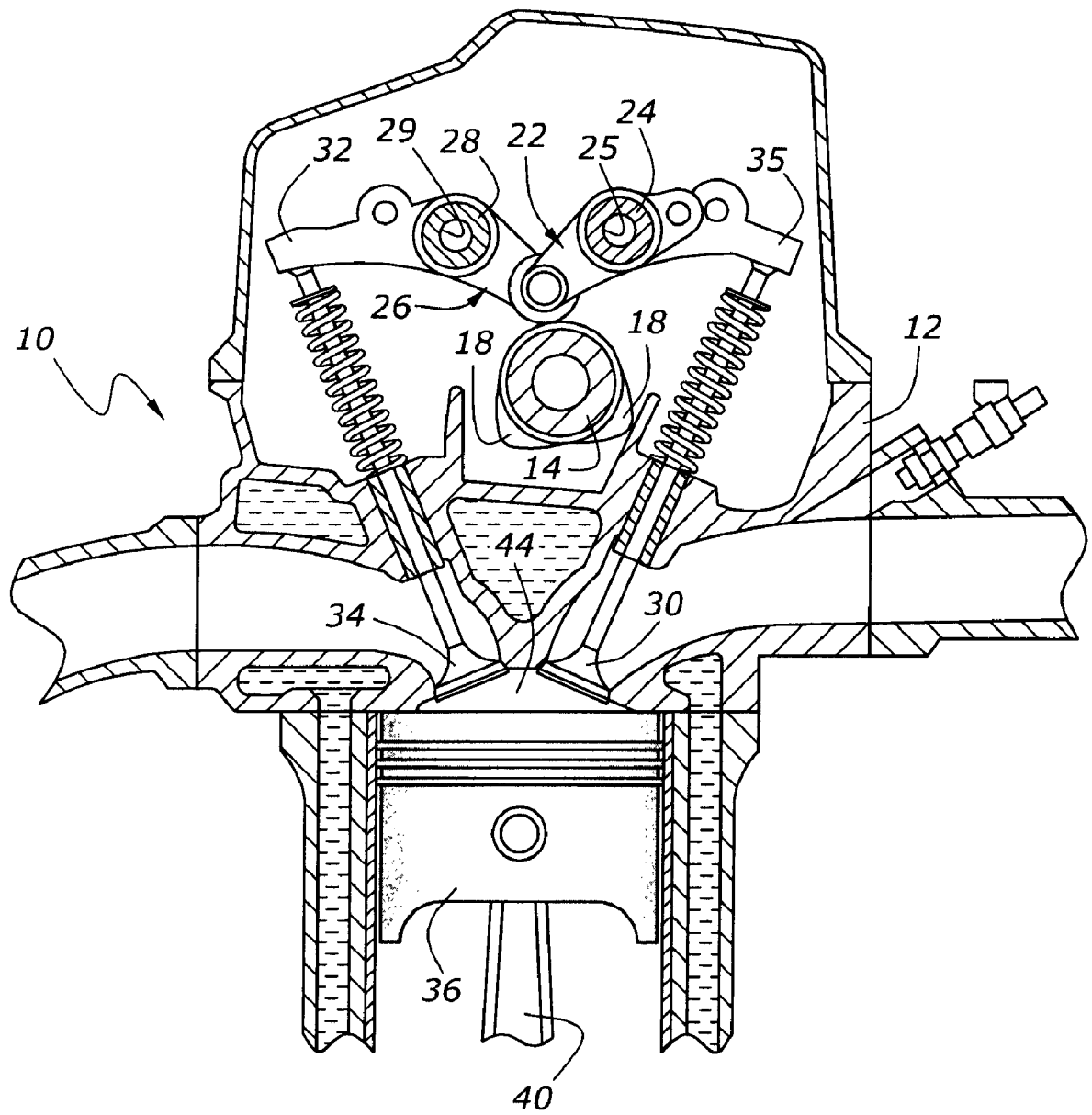
FIG. 2 is a sectional view of an engine having a cylinder valve operating system according to the present invention.

As shown in FIG. 2, engine 10 has a cylinder head, 12, which houses a camshaft, 14. FIG. 1 shows camshaft 14 as being driven by sprocket 16. As shown in FIGS. 1 and 2, camshaft 14 has a number of cam lobes, 18, which provide force impulses for opening intake valves 30 and exhaust valves 34. Intake valves 30 are driven by intake valve operators 22, which are mounted upon intake rocker shaft 24. Exhaust valves 34 are operated by exhaust valve operators 26, which are mounted upon exhaust valve rocker shaft 28. Intake valve operators 22 include intake valve contactors 35, and exhaust valve operators 26 include exhaust valve contactors 32.

Engine 10, being a reciprocating internal combustion engine, further includes piston 36 mounted upon connecting rod 40, as well as combustion chamber 44. Valves 30 and 34, being conventional poppet valves, effectively deactivate the engine's power cylinder when the valves 30 and 34 are maintained in a steady-state closed position. During deactivation it is desirable to trap a charge of burnt exhaust gasses within combustion chamber 44, and the system shown schematically in FIG. 1 accomplishes this.

Moving specifically to FIG. 1, camshaft 14 is shown as having a metering surface formed as a generally cylindrical journal, 20, which has a continuous metering groove, 13 which circumscribes journal 20, as well as a discontinuous metering groove 15, which has at least one land 15a, which establishes the discontinuity of groove 15. Journal 20 extends within a central bore, 55, formed within valve body 52. Those skilled in the art will appreciate in view of this disclosure that valve body 52 may be configured as ether a stand-alone valve block, or as the illustrated camshaft mounting tower combining the function of both a valve block and a camshaft saddle. In either event, metering groove 13 connects supply port 62, which is downstream from supply valve 48, to outlet port 54, which is in turn connected with exhaust valve rocker shaft 28 shown in FIGS. 2 and 3. Rocker shaft 28 has an axial passage, 29, which conducts high pressure oil for deactivating exhaust valve operators 26.

When high pressure oil from oil pump 42 moves through valve 48 and into supply port 62, pressure communicated through continuous metering groove 13 builds immediately at outlet port 54, thereby deactivating exhaust valve 34, as described below in connection with FIG. 3. However, because of land 15a, which is part of discontinuous groove 15, the pressure signal from supply port 62 is communicated to outlet port 58, which is connected with intake rocker shaft 24, only after land 15a moves past outlet port 58. As a result, the combination of camshaft journal 20 with valve body 52 functions effectively as a hydraulic phase shifter integrated with camshaft 14 so as to phase, or delay, the hydraulic signal to intake valve operators 22, thereby delaying their deactivation, as compared with exhaust valve operators 26. This traps a charge of burnt gases within combustion chamber 44 of engine 10. Those skilled in the art will appreciate in view of this disclosure that pump 42 could be configured either as a lubricating oil pump for engine 10, or as a dedicated hydraulic pump, or yet another type of pump suggested by this disclosure.

Figure 3:
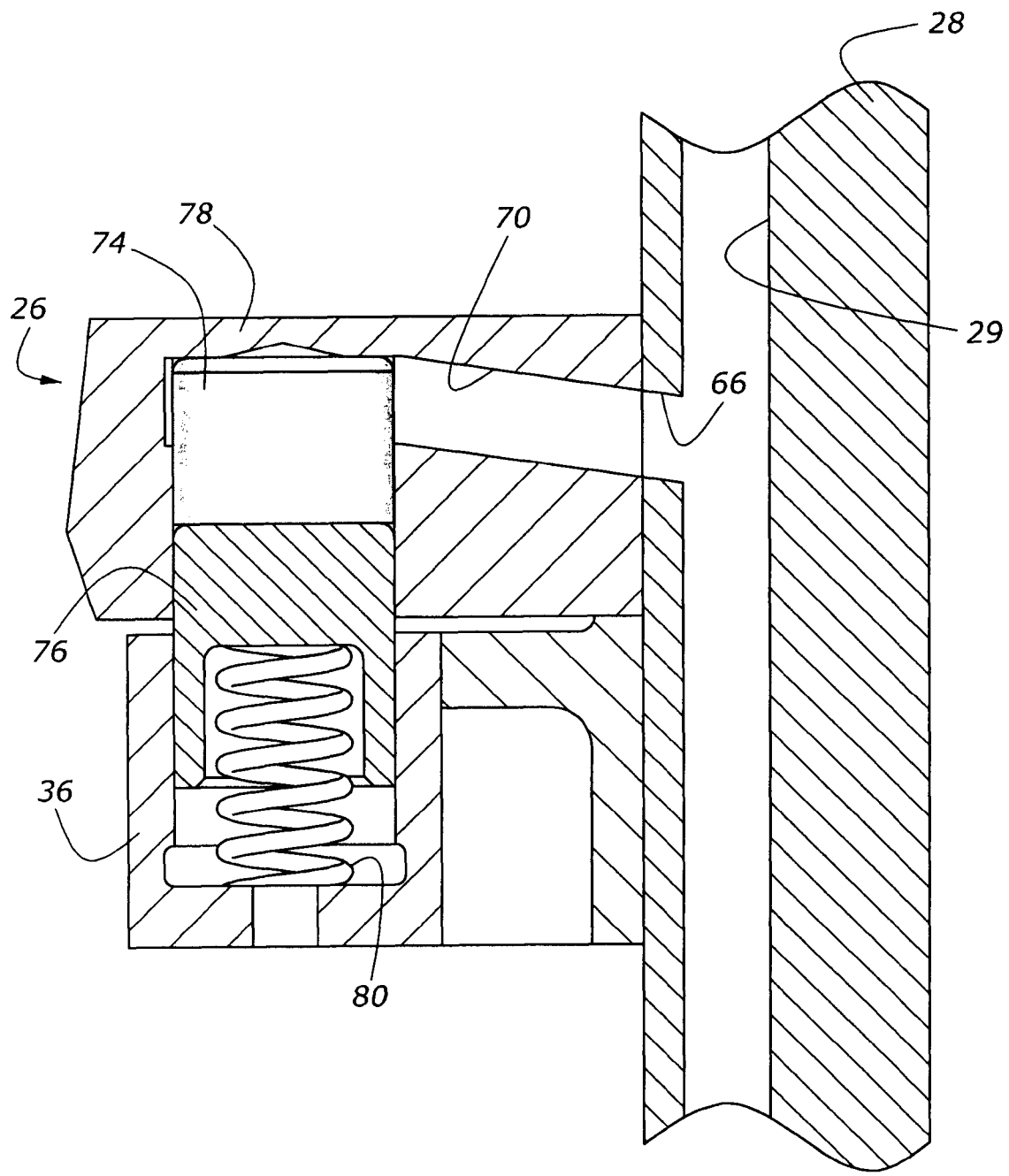
FIG. 3 shows a valve operator according to an aspect of the present invention.

In FIG. 3, exhaust valve operator 26 is shown as having an oil passage, 70, which extends within camshaft follower 78, and which communicates with port 66 in rocker shaft 28. Piston 74 and latching pin 76 selectively lock follower 78 to exhaust valve contacting finger 32, which causes finger 32 to move in response to the motion of follower 78. Piston 74 is acted upon by oil pressure within oil passages 29 and 70. High oil pressure within passage 70 forces piston 74 from the at-rest position of FIG. 3, against the force of spring 80, which acts upon normally locked latching pin 76. When normally locked latching pin 76 is fully displaced by high pressure oil acting upon piston 74, latching pin 76 stops at a position where follower 78 is no longer locked to exhaust valve contacting finger 32, and exhaust valve 34 is therefore disabled. While operator 26 is in this disabled state, camshaft follower 78 merely rocks according to the movement of one of cam lobes 18, while exhaust valve 34 and finger 32 remain stationary in the closed position. Those skilled in the art will appreciate in view of this disclosure that oil passage 70 and piston 74 could be situated within finger 32, with latching pin 76 and piston 74 being housed within camshaft follower 78.

Figure 4A:
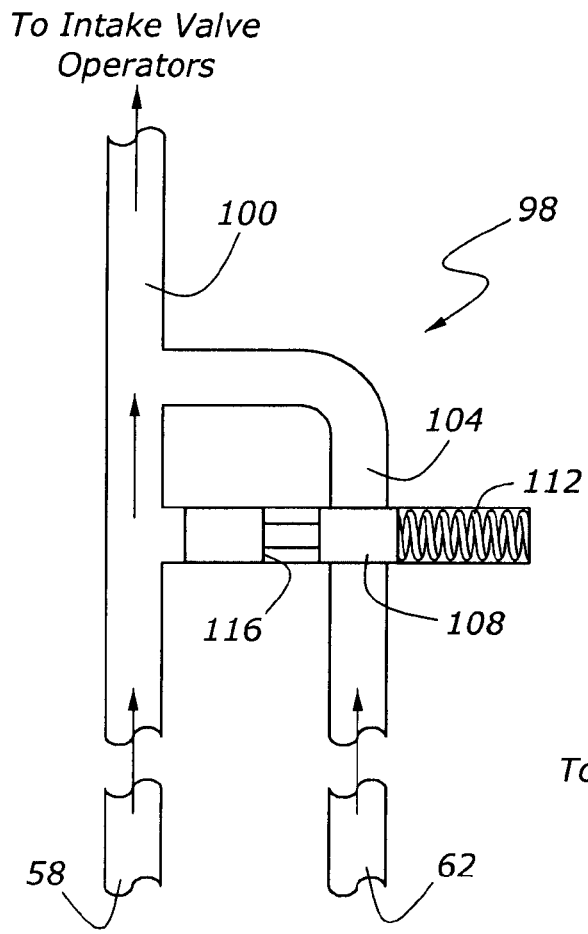
FIGS. 4A and 4B illustrate a bypass valve according to an aspect of the present invention.
Figure 4B:
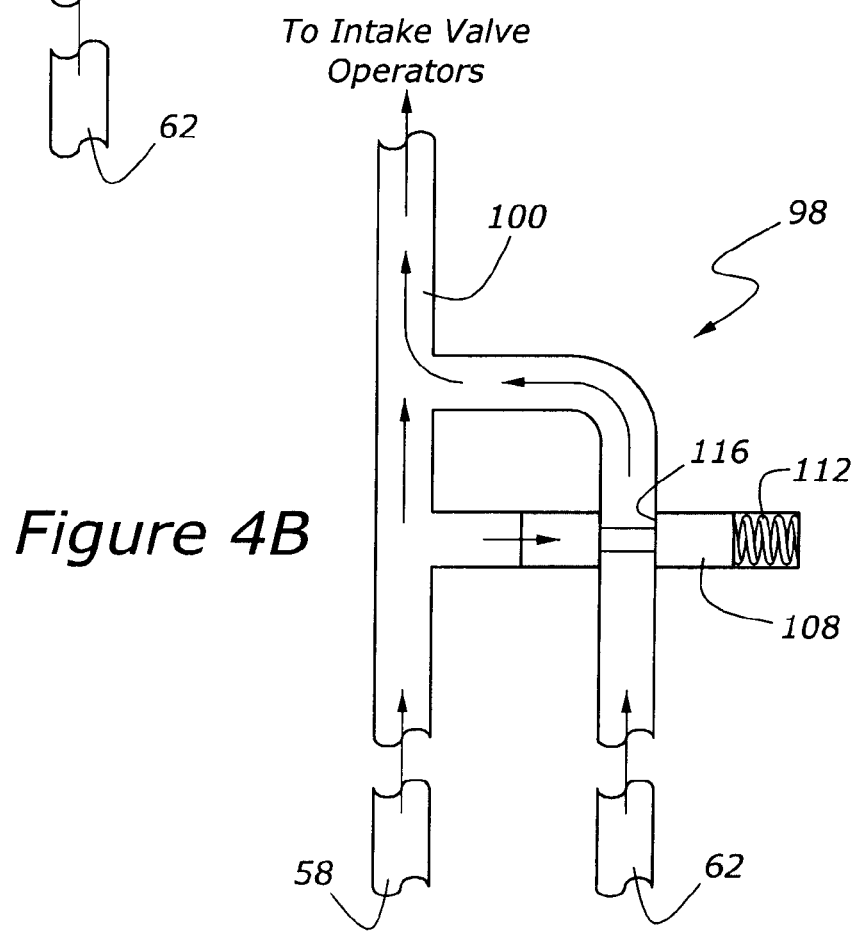

Because the pressure signal within outlet port 58 tends to pulsate as a result of the intermittent interruption of the supply of oil occasioned by the action of land 15a of discontinuous metering groove 15, in a preferred embodiment, hydraulic accumulator 46 (FIG. 1) may be inserted in the passage between outlet port 58 and intake valve operators 22. Additionally, or alternatively, bypass valve 98, shown in FIGS. 4A and 4B, may be provided. In FIG. 4A, bypass valve 98 is shown in a closed position, such that pressure from outlet port 58 passes freely to intake valve operator supply passage 100. Note that in FIG. 4A, the flow of oil from port 62 is blocked by the position of spool 108. Once, however, pressure is applied by means of control valve 48, and pressure is allowed to build within intake valve operator supply passage 100, valve spool 108 will be pushed to the open position, as shown in FIG. 4B. When valve 98 is in the position as shown in FIG. 4B, high pressure hydraulic fluid, which is often engine oil, flows through control port 116 from port 62 and to intake valve operators 22, so that the effect of the pulsation which would otherwise be caused by the hydraulic phase shifter integrated with camshaft 14 will be mitigated.

Those skilled in the art will appreciate in view of this disclosure that valve operator passage 100, which is operatively connected with intake valve operators 22, may be incorporated, for example, as passage 25 within hollow rocker shaft 24, in the event that the illustrated shaft-mounted rocker arms are employed. Alternatively, passages may be cored or drilled within a cylinder head casting if pedestal-mounted rockers are used.

According to another aspect of the present invention, both the intake valve operator and the exhaust valve operator of a first cylinder may be controlled simultaneously by connecting one of outlet ports 54 and 58 to both operators of the first cylinder. If the intake and exhaust valve operators of a second cylinder are connected with the other of outlet ports 54 and 58, the result will be that deactivation and reactivation of both the intake valve and the exhaust valve of the second cylinder will be phased with respect to the first cylinder. In essence, the present system is useful for phasing the deactivation and reactivation of a first group of valve operators, associated with a first cylinder, with respect to a second group of valve operators associated with a second cylinder.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A cylinder valve operating system for an internal combustion engine, comprising:
    a camshaft having a plurality of lobes;
    a plurality of hydraulically controllable intake valve operators driven by said lobes;
    a plurality of intake valves actuated by said intake valve operators;
    a plurality of hydraulically controllable exhaust valve operators driven by said lobes;
    a plurality of exhaust valves actuated by said exhaust valve operators;
    a source of high pressure oil; and
    a valving system for selectively furnishing high pressure oil to said intake valve operators and to said exhaust valve operators, with said valving system comprising a hydraulic phase shifter integrated with said camshaft and connected between said source of high pressure oil and said intake valve operators and said exhaust valve operators, so as to phase the hydraulic control of said intake valve operators with respect to said exhaust valve operators, wherein said hydraulic phase shifter comprises:
        a valve body having a central bore equipped with a supply port for receiving oil from said high pressure source, and a plurality of outlet ports, with a first outlet port connected with said intake valve operators, and a second outlet port connected with said exhaust valve operators; and
        a metering surface formed on said camshaft, with said metering surface extending within said central bore of said valve body, and with said metering surface comprising a generally cylindrical surface having a plurality of metering grooves for connecting said supply port with said outlet ports in a phased relationship.

2. A cylinder valve operating system according to claim 1, wherein said valving system further comprises a supply valve for coupling said source of high pressure oil to said hydraulic phase shifter.

3. A cylinder valve operating system according to claim 2, wherein said supply valve further comprises a bypass for routing oil directly from said high pressure source to at least one of said intake valve operators and said exhaust valve operators without passing through said hydraulic phase shifter.

4. A cylinder valve operating system according to claim 1, wherein said valve body comprises a camshaft mounting tower integrated with a cylinder head.

5. A cylinder valve operating system according to claim 1, further comprising a hydraulic accumulator interposed between said hydraulic phase shifter and at least one of said intake valve operators and said exhaust valve operators.

6. A cylinder valve operating system according to claim 1, wherein said valving system further comprises a bypass for routing oil directly from said high pressure source to at least one of said intake valve operators and said exhaust valve operators without passing through said hydraulic phase shifter.

7. A cylinder valve operating system according to claim 1, wherein said intake valve operators and said exhaust valve operators are carried upon at least one shaft mounted to a cylinder head of an engine.

8. A cylinder valve operating system according to claim 1, wherein said intake valve operators and said exhaust valve operators are carried upon separate shafts mounted to a cylinder head of an engine.

9. A cylinder valve operating system according to claim 1, wherein said intake valve operators and said exhaust valve operators are hydraulically controlled to selectively disable the intake valves and exhaust valves actuated by said intake valve operators and said exhaust valve operators.

10. A cylinder valve operating system according to claim 9, wherein said hydraulic phase shifter cooperates with said intake valve operators and said exhaust valve operators to disable at least one intake valve and at least one exhaust valve, with said at least one exhaust valve being disabled before said at least one intake valve is disabled, whereby exhaust gas will be trapped within a cylinder of the engine.

11. A cylinder valve operating system according to claim 1, wherein said plurality of metering grooves for connecting said supply port with said outlet ports in a phased relationship comprises a continuous, circumferential groove for connecting said supply port with an outlet port operatively connected with at least one exhaust valve operator, and a discontinuous, semi-circumferential groove adjoining said continuous groove, for intermittently connecting said supply port with at least one intake valve operator.

12. A cylinder valve operating system for an internal combustion engine, comprising:
    a camshaft having a plurality of lobes;
    a plurality of hydraulically controllable intake valve operators driven by said lobes;
    a plurality of intake valves actuated by said intake valve operators;
    a plurality of hydraulically controllable exhaust valve operators driven by said lobes;
    a plurality of exhaust valves actuated by said exhaust valve operators;
    a source of high pressure hydraulic oil; and
    a valving system for selectively furnishing a high pressure deactivation signal to said intake valve operators and to said exhaust valve operators, with said valving system comprising a hydraulic phase shifter integrated with said camshaft and connected between said source of high pressure oil and said intake valve operators and said exhaust valve operators, with said hydraulic phase shifter comprising:
    a valve body having a central bore equipped with a supply port for receiving oil from said high pressure source, and a plurality of outlet ports, with a first outlet port connected with said intake valve operators, and a second outlet port connected with said exhaust valve operators; and
    a metering surface formed on said camshaft, with said metering surface extending within said central bore of said valve body, and with said metering surface comprising a generally cylindrical surface having at least one metering groove for connecting said supply port with said outlet ports in a phased relationship.

13. A cylinder valve operating system according to claim 12, wherein said at least one metering groove for connecting said supply port with said outlet ports in a phased relationship comprises a groove for continuously connecting said supply port with an outlet port operatively connected with at least one exhaust valve operator, with said groove also serving to discontinuously connect said supply port with at least one intake valve operator, whereby an exhaust valve will be deactivated before the intake valve for the same cylinder is deactivated.

14. A cylinder valve operating system according to claim 12, wherein said hydraulically controllable intake valve operators and said hydraulically controllable exhaust valve operators each comprise:
   a camshaft follower;
   a valve contacting finger; and
   a hydraulic latching pin slidably located between said camshaft follower and said valve contacting finger, wherein said hydraulically latching pin is responsive to pressure within a passage connected with said hydraulic phase shifter.

15. A cylinder valve operating system according to claim 12, wherein said metering surface is formed upon a journal of said camshaft.

16. A cylinder valve operating system for selectively disabling cylinders of a multicylinder internal combustion engine, comprising:
   a camshaft having a plurality of lobes;
   a plurality of hydraulically controllable intake valve operators driven by a first portion of said lobes, with said intake valve operators being controllable to selectively disable intake valves driven by said operators;
   a plurality of intake valves driven by said intake valve operators;
   a plurality of hydraulically controllable exhaust valve operators driven by a second portion of said lobes, with said exhaust valve operators being controllable to selectively disable exhaust valves driven by said exhaust valve operators;
   a plurality of exhaust valves driven by said exhaust valve operators;
   a valving system for selectively disabling cylinders of the engine by furnishing high pressure oil to said intake valve operators and to said exhaust valve operators, with said valving system comprising a hydraulic phase shifter integrated with said camshaft and connected between a source of high pressure oil and said intake valve operators and said exhaust valve operators, with the hydraulic phase shifter comprising:
   a valve body having a bore equipped with a supply port for receiving oil from the high pressure source, and a plurality of outlet ports, with a first outlet port connected with the intake valve operators, and a second outlet port connected with the exhaust valve operators; and
   a metering surface formed on the camshaft, with the metering surface extending within the bore of said valve body, and with the metering surface comprising a generally cylindrical surface having at least one metering groove for connecting said supply port with said outlet ports in a phased relationship, whereby the exhaust valve for one of said cylinders will be disabled before the intake valve for the same cylinder, so as to trap exhaust gas within the disabled cylinder.

17. A cylinder valve operating system for an internal combustion engine, comprising:
   a camshaft having a plurality of lobes;
   a plurality of hydraulically controllable intake valve operators driven by said lobes;
   a plurality of intake valves actuated by said intake valve operators;
   a plurality of hydraulically controllable exhaust valve operators driven by said lobes;
   a plurality of exhaust valves actuated by said exhaust valve operators;
   a source of high pressure hydraulic oil; and
   a valving system for selectively furnishing a high pressure deactivation signal to said intake valve operators and to said exhaust valve operators, with said valving system comprising a hydraulic phase shifter integrated with said camshaft and connected between said source of high pressure oil and said intake valve operators and said exhaust valve operators, with said hydraulic phase shifter comprising:
   a valve body having a central bore equipped with a supply port for receiving oil from said high pressure source, and a plurality of outlet ports, with a first outlet port connected with a first group of said intake and exhaust valve operators, and a second outlet port connected with a second group of said intake and exhaust valve operators; and
   a metering surface formed on said camshaft, with said metering surface extending within said central bore of said valve body, and with said metering surface comprising a generally cylindrical surface having at least one metering groove for connecting said supply port with said outlet ports in a phased relationship, whereby deactivation of said first group of intake and exhaust valve operators will be phased with respect to deactivation of said second group of intake and exhaust valve operators.

* * * * *